No. 626,113. Patented May 30, 1899.
W. A. VAUGHN.
SHAFT CLUTCHING AND RELEASING DEVICE.
(Application filed Jan. 23, 1899.)
(No Model.) 2 Sheets—Sheet 1.
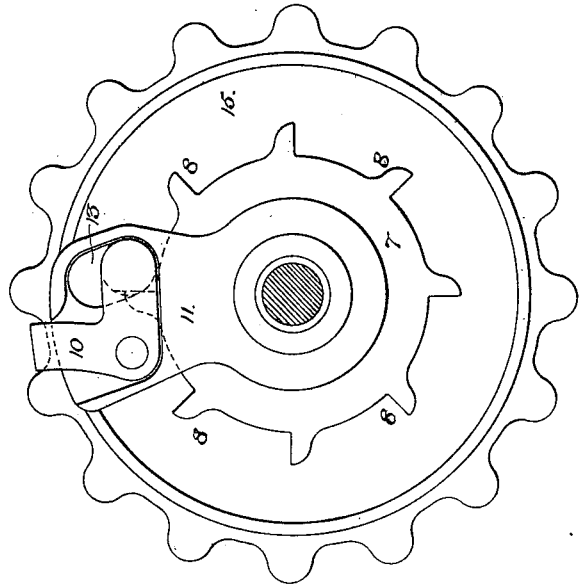
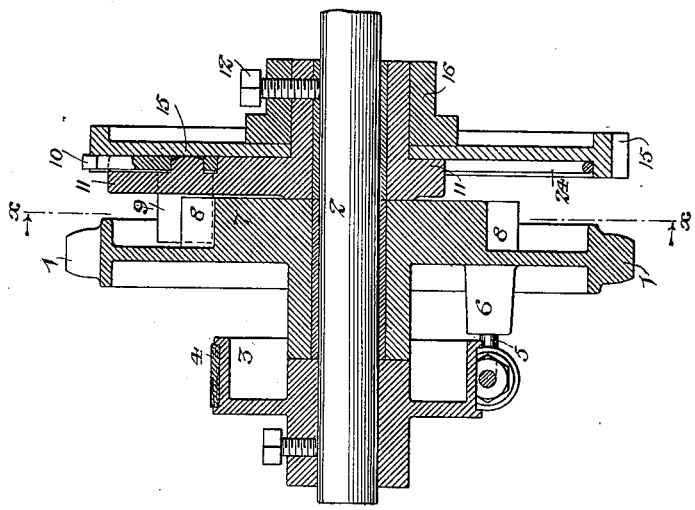
Witnesses:-
Frank L. A. Graham
Louis M. F. Whitehead
Inventor:-
Warton A. Vaughn
by his Attorneys
THE NORRIS PETERS CO., PHOTO-LITHO., WASHINGTON, D. C.

No. 626,113. Patented May 30, 1899.
W. A. VAUGHN.
SHAFT CLUTCHING AND RELEASING DEVICE.
(Application filed Jan. 23, 1899.)
(No Model.) 2 Sheets—Sheet 2.

Witnesses:-
Frank L. A. Graham
Louis M. F. Whitehead

Inventor:-
Warton A. Vaughn.
by his Attorneys:-
Howson & Howson

THE NORRIS PETERS CO., PHOTO-LITHO., WASHINGTON, D. C.

UNITED STATES PATENT OFFICE.

WARTON A. VAUGHN, OF PHILADELPHIA, PENNSYLVANIA, ASSIGNOR TO THE JAMES SMITH WOOLEN MACHINERY COMPANY, OF SAME PLACE.

SHAFT CLUTCHING AND RELEASING DEVICE.

SPECIFICATION forming part of Letters Patent No. 626,113, dated May 30, 1899.

Application filed January 23, 1899. Serial No. 703,176. (No model.)

*To all whom it may concern:*

Be it known that I, WARTON A. VAUGHN, a citizen of the United States, residing in Philadelphia, Pennsylvania, have invented certain Improvements in Shaft Clutching and Releasing Mechanism, of which the following is a specification.

The object of my invention is to so construct an automatic shaft clutching and releasing device that the same will be quick in action in effecting the clutching of the shaft and will be of durable construction, being designed to effectually resist the shock or jar resulting from the engagement of the clutching elements.

Figure 4:
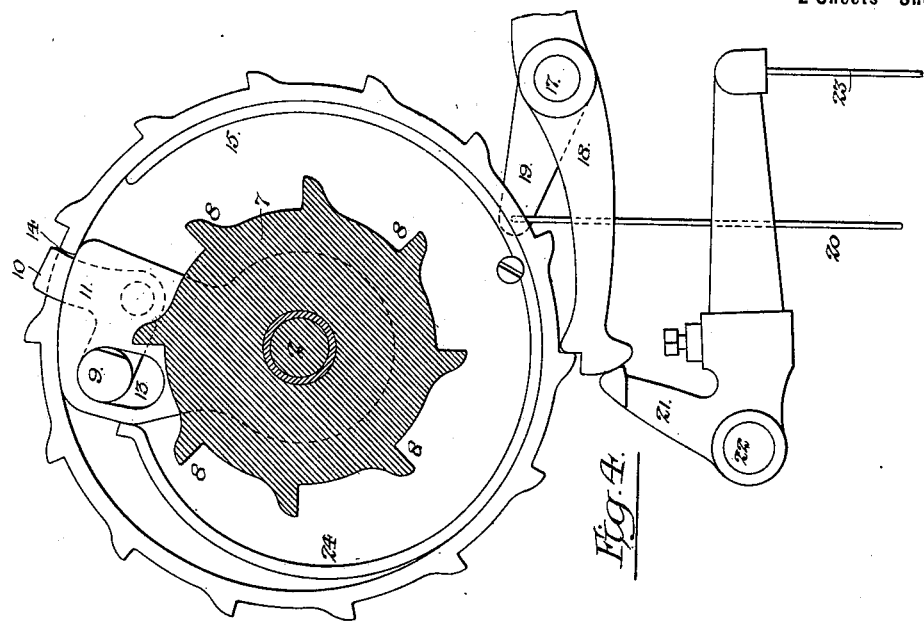
Figure 5:
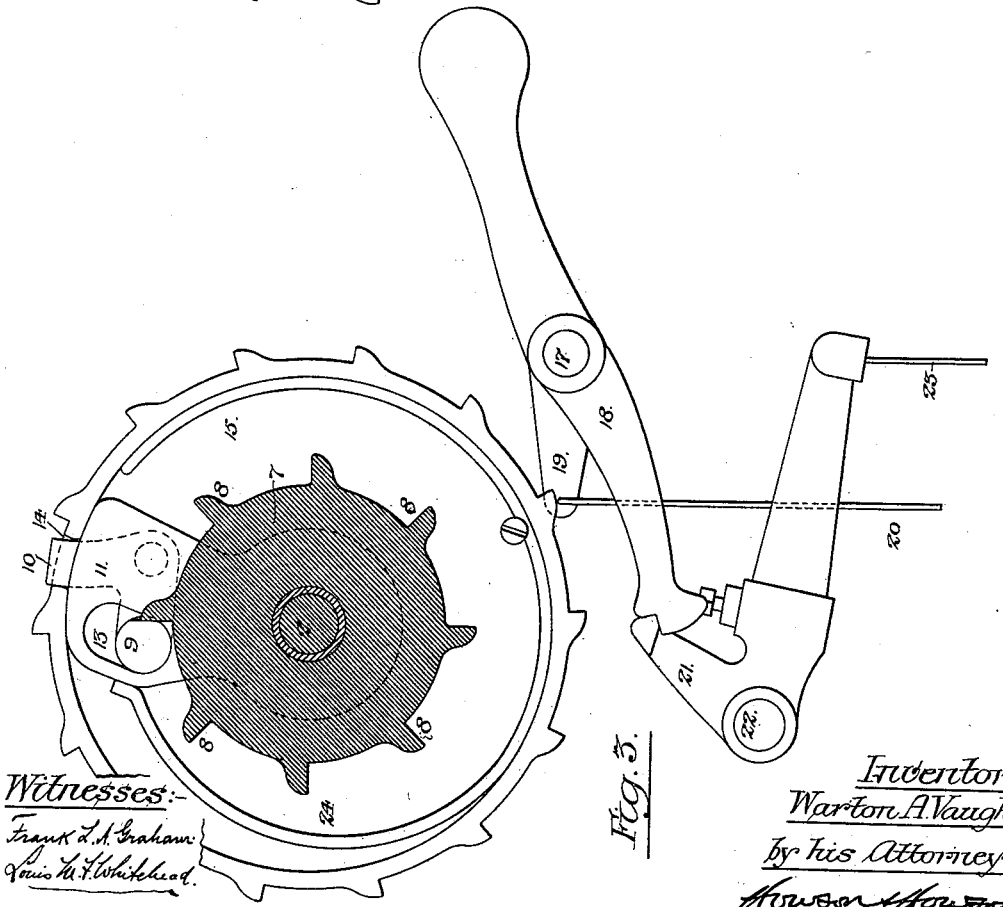

In the accompanying drawings, Figure 1 is a longitudinal sectional view of a shaft clutching and releasing device constructed in accordance with my invention. Fig. 2 is an end view of the same with some of the parts removed. Figs. 3 and 4 are views, partly in elevation and partly in section on the line $x\,x$, Fig. 1, showing the operative parts of the clutch in different positions—that is to say, showing in Fig. 3 the parts in position for clutching the shaft and in Fig. 4 the parts in position for releasing the shaft.

1 represents a sprocket-wheel or other wheel to which continuous rotary motion is imparted, and 2 the shaft which is to be clutched to or released from this rotating wheel. Secured to the shaft 2 is a drum 3, to which is adapted a friction-band 4, this band having a pin 5, engaging with a lug 6 on the sprocket-wheel 1, so that there is always a frictional connection between said wheel and the shaft, this frictional connection, however, not being sufficient to overcome the normal resistance upon the shaft—that is to say, not being strong enough to turn the shaft with the load upon it.

Secured to or forming part of the sprocket-wheel 1 is a ratchet-wheel 7, having a series of projecting teeth 8, with any one of which is adapted to engage a pin or block 9, which projects from one arm of a bell-crank lever 10, pivotally mounted within a recess in an arm 11, which has a hub secured to the shaft 2 by means of a set-screw 12, the pin or block 9 projecting through a slot 13 in said arm, as shown in Figs. 2, 3, and 4. The other arm of the lever 10 engages with a slot 14, formed in the toothed periphery of a disk 15, which is free to turn on the hub of the arm 11 to an extent limited by the movement of said lever 10, longitudinal confinement of the disk 15 being effected by means of a collar 16, secured to the hub of the arm 11 by the same set-screw which secures said hub to the shaft 2. Mounted upon a rock-shaft 17, adjacent to the disk 15, is a catch-lever 18, having one of its arms notched for engagement with the teeth of the said disk 15 and the other arm weighted, so that the normal tendency of said catch-lever is to engage with and retain the teeth of the disk 15. On the rock-shaft 17, however, is an arm 19, with depending cord, wire, or other connection 20, so that by a downward pull upon this connection 20 the catch-lever 18 may be depressed, so as to release the toothed disk 15 from its restraining influence, and the catch-lever may be retained in this depressed position by means of a trigger 21, hung to a stud or pin 22 and having a normal tendency to engage with the catch-lever, a rod or other connection 23, however, serving by a lifting movement to so move the trigger as to release the catch-lever 18 and permit the same to rise.

Within a recess in the inner face of the disk 15 is contained a spring 24, the free end of which bears upon the arm 11, as shown in Figs. 3 and 4, the tendency of this spring being to move the disk 15 constantly forward in respect to the arm 11 to an extent limited by the movement of the lever 10 on said arm, such forward movement of the lever being limited by contact of the pin 9 with the bottom of the slot 13 in the arm, as shown in Fig. 3.

When the shaft 2 is clutched to the sprocket-wheel 1, the parts occupy the position shown in Fig. 3, the pin 9 being in engagement with one of the teeth of the ratchet-wheel 7 and being consequently carried around with the same, so as to impart corresponding rotative movement to the arm 11 and shaft 2, and also through the medium of the lever 10 to the toothed disk 15, the catch-lever 18 being depressed and held in the depressed position by the trigger 21, so as not to interfere with the free rotation of said disk.

When it is desired to release the shaft from the control of the sprocket-wheel, the trigger 21 is moved so as to release the catch-lever 18 and the latter consequently rises, so as to engage with one of the teeth of the disk 15, and thus arrest the rotation of the same.

There is of course a corresponding arrest of movement of the outwardly-projecting arm of the lever 10, which engages with the slot 14 in the flange of the disk 15, and as the arm 11 continues to move forwardly and carries with it the pivot of said lever the effect is to immediately move the lever to the position shown in Fig. 4, so as to carry the pin 9 out of the path of the teeth of the ratchet-wheel 7, thereby releasing the shaft 2 from positive connection with the sprocket-wheel 1. There is, however, still the frictional connection between the sprocket-wheel and shaft, and this is sufficient to maintain the arm 11 in the advanced position so long as the toothed disk 15 is under restraint. Hence the pin 9 will be constantly held out of engagement with the teeth of the ratchet-wheel 7 so long as the forward rotation of the disk 15 is arrested. When, however, the catch-lever 18 is again depressed, so as to free the toothed disk 15 from restraint, said disk will immediately be thrown forward by the action of the spring 24, so as to again move the lever 10 to the position shown in Fig. 3 and cause the pin 9 of said lever to engage with one of the teeth of the ratchet-wheel 7.

It will be evident that a very quick clutching of the shaft 2 to the ratchet-wheel 7 is effected as soon as the toothed disk 15 is released from the restraint of the catch-lever 18, since the ratchet-wheel cannot turn to a greater extent than the distance between successive teeth before the clutching action is effected. The ratchet-wheel also presents a body of considerable bulk, which offers effective resistance to the shock or jar by engagement of the tooth 8 and pin 9, and therefore this ratchet-wheel construction is preferred to a series of independent pins or teeth projecting from the inner face of the sprocket-wheel or other driver 1, although the latter construction is within the broader scope of my invention.

Having thus described my invention, I claim and desire to secure by Letters Patent—

1. The combination of the shaft to be driven, the drive-wheel thereon having a projecting ratchet-wheel, frictional driving connection between the said driving-wheel and the shaft, an arm secured to the shaft, a toothed disk mounted so as to be free to turn on the shaft, a two-armed lever hung to the arm which is secured to the shaft, one arm of said lever carrying a pin movable into and out of engagement with the teeth of the ratchet-wheel and the other arm of said lever entering a slot or recess in a flange of the toothed disk, a spring tending to move said disk so as to cause it to act on one arm of the lever and cause the pin carried by the other arm of the same to engage with the ratchet-wheel, and means for stopping and releasing the toothed disk, substantially as specified.

2. The combination of the shaft to be driven, the drive-wheel thereon having a projecting ratchet-wheel, frictional driving connection between said drive-wheel and the shaft, an arm secured to the shaft and having a slot therein, a toothed disk free to turn on the shaft, a two-armed lever hung to said arm which is secured to the shaft, one of the arms of said lever having a pin projecting through the slot in the carrier-arm and adapted to engage with the teeth of the ratchet-wheel, and the other arm of said lever entering a recess or slot in a flange of the toothed disk, a spring tending to move said disk so as to cause movement of the lever into engaging position, and means for stopping and releasing the disk, substantially as specified.

3. The combination of the shaft to be driven, the drive-wheel thereon having a projecting ratchet-wheel, frictional driving connection between said drive-wheel and the shaft, an arm secured to the shaft and having one of its faces recessed, a toothed disk free to turn on the shaft, a two-armed lever contained within said recess in the face of the fixed arm pivoted to said arm and having one of its arms provided with a projecting pin adapted to engage with the teeth of the ratchet-wheel and its other arm entering a slot or recess in a flange of the toothed disk, a spring tending to move said disk so as to throw the lever into engaging position, and means for stopping and releasing the disk, substantially as specified.

In testimony whereof I have signed my name to this specification in the presence of two subscribing witnesses.

WARTON A. VAUGHN.

Witnesses:
FRANK S. TAYLOR,
WM. H. CLARKSON.